United States Patent [19]

Maione et al.

[11] 4,019,048
[45] Apr. 19, 1977

[54] REGENERATOR FOR AN OPTICAL TRANSMISSION SYSTEM

[75] Inventors: Theodore Lincoln Maione, Little Silver; Frederick Enyeart Radcliffe, Lavallette; Darrell Dean Sell, Holmdel; Dan Holden Wolaver, Edison, all of N.J.

[73] Assignee: Bell Telephone Laboratories, Incorporated, Murray Hill, N.J.

[22] Filed: Mar. 22, 1976

[21] Appl. No.: 668,851

[52] U.S. Cl. .............................................. 250/199
[51] Int. Cl.² ........................................ H04B 9/00
[58] Field of Search ................................. 250/199

[56] References Cited
UNITED STATES PATENTS

| | | | |
|---|---|---|---|
| 3,801,819 | 4/1974 | Ohnsorge | 250/199 |
| 3,943,358 | 3/1976 | Reymond et al. | 250/199 |

*Primary Examiner*—Richard Murray
*Attorney, Agent, or Firm*—Richard B. Havill

[57] ABSTRACT

An optical pulse stream regenerator includes an optical receiver, a decision and timing circuit, and an optical transmitter. In response to an incident optical data pulse stream, a variable gain receiver section produces an electrical data pulse stream representing the incident optical data pulse stream. The receiver section is stabilized by having different variable gain devices respond to separate ranges of an automatic gain control signal. In response to the receiver section electrical data pulse stream, a phase-lock frequency-lock circuit in the timing circuit recovers a clock pulse stream that is synchronized with the incident optical data pulse stream, and the decision circuit regenerates an electrical data pulse stream representing the incident optical data pulse stream. In the transmitter section, an injection laser is controlled by the regenerated electrical data pulse stream and by a prebias signal that is established in response to the difference between a signal representing the optical output power of the laser and a signal representing the regenerated electrical data pulse stream. The injection laser regenerates an output optical data pulse stream representing the incident optical data pulse stream.

34 Claims, 4 Drawing Figures

OPTICAL TRANSMISSION LINE REGENERATOR

OPTICAL TRANSMISSION LINE REGENERATOR

FIG. 2 OPTICAL RECEIVER SECTION 200

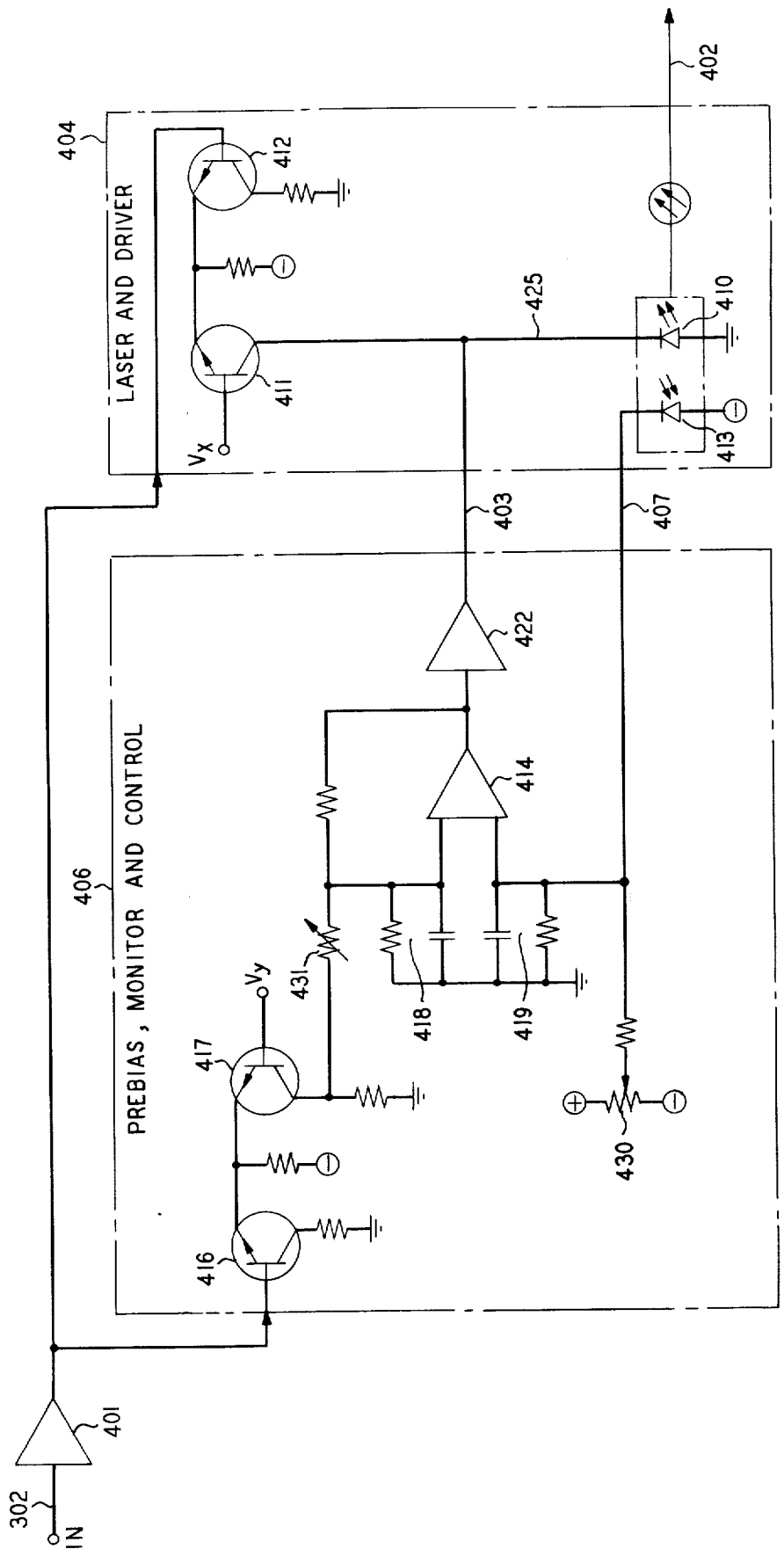
FIG. 4 OPTICAL TRANSMITTER SECTION 400

REGENERATOR FOR AN OPTICAL TRANSMISSION SYSTEM

BACKGROUND OF THE INVENTION

The invention is a regenerator that is more particularly described as a regenerator for a fiber optic transmission system.

Exploratory research and development of optical devices and components have progressed sufficiently during recent years that a fiber optic digital transmission system now can be built and operated. Multimode and single mode glass fibers can transmit optical signals over long distances. In new glass fibers, light losses are less than 5 decibels per kilometer for wavelengths between 800 nanometers and 1100 nanometers. Some single mode borosilicate fibers have a minimum loss of 2.2 decibels per kilometer at 850 and 1020 nanometers and a dispersion of approximately 0.4 nanoseconds per kilometer. Fibers with the above characteristics are useful for digital communications systems. A moderate pulse rate optical system can be used economically for telephone exchange trunking in congested metropolitan areas having a large and growing traffic cross section.

In the glass fibers, optical pulses are attenuated as they proceed through any fiber. Along any fairly long communications route, it is necessary to regenerate the optical pulse stream for insuring accurate communication from one end of the system to the other.

In the prior art, most of the basic optical regenerator circuitry is similar to the circuitry employed in commercial pulse code modulation systems which transmit electrical pulses over copper wire pairs or coaxial cables. In the optical regenerators, optical elements such as avalanche photodiodes and lasers have been inserted for converting optical power to electrical signals and vice versa.

Also in the prior art, phase-lock loops have been used to extract timing information from an input pulse stream; however, those phase-lock loops use narrow range acquisition requiring expensive crystal control.

Additionally in the prior art, an injection laser is operated in response to a feedback control circuit which senses the output optical power from the laser and attempts to maintain a constant average optical output power. Occasionally, many time slots pass wherein no pulses are applied to the input of such a laser. The prebias current rises to maintain constant output power. Subsequently irreversible damage can occur to the laser when pulses are applied again.

Therefore, it is an object to provide an improved regenerator for an optical transmission system.

It is another object to provide a regenerator for a moderately high pulse rate and low error rate optical transmission system.

It is a further object to provide an optical regenerator having a wide dynamic range, i.e., operable for a wide range of input optical powers.

It is a still further object to provide an optical regenerator for producing substantially constant amplitude output pulses of light throughout a long lifetime.

SUMMARY OF THE INVENTION

These and other objects of the invention are realized by an illustrative optical regenerator including an optical receiver, a decision and timing circuit and an optical transmitter. In response to an incident optical data pulse stream, a variable gain receiver section produces a constant amplitude electrical data pulse stream representing the incident optical data pulse stream. The receiver section is stabilized because an amplifier varies gain in response to a first range of an automatic gain control signal and an avalanche photodiode varies gain in response to a second range of the automatic gain control signal. In response to the receiver electrical data pulse stream, a phase-lock frequency-lock circuit in the timing circuit recovers a clock pulse stream that is synchronized with the incident optical data pulse stream, and the decision circuit regenerates an electrical data pulse stream representing the incident optical data pulse stream. In the transmitter section, an injection laser is controlled by the regenerated electrical data pulse stream and by a prebias current that is established in response to the difference between a signal representing the optical output power of the laser and a signal representing the regenerated electrical data pulse stream. A resulting regenerated output optical data pulse stream represents the incident optical data pulse stream.

A feature of the invention is an optical receiver section wherein an amplifier varies gain in response to a first range of an automatic gain control signal and an avalanche photodiode varies gain in response to a second range of the automatic gain control signal.

Another feature is an optical regenerator including a phase-lock frequency-lock circuit responsive to the electrical data pulse stream from the receiver section for recovering a clock pulse stream synchronized with the incident optical data pulse stream.

Another feature is a clock recovery circuit including a frequency difference detector responsive to a baud component signal from the data pulse stream for producing a series of pulses having a polarity to reduce the difference between the frequency of a controlled clock pulse oscillator and the baud of the data pulse stream and having a rate proportional to the frequency difference for forcing the frequency of the controlled oscillator into the capture range of a phase-lock loop responsive to the baud component signal for forcing the frequency and the phase of the controlled clock pulse oscillator into synchronization with the received optical data pulse stream.

A further feature is an injection laser control circuit that supplies to the laser a prebias signal that is established in response to the difference between a signal representing the optical output power of the laser and a signal representing the regenerated electrical data pulse stream.

BRIEF DESCRIPTION OF THE DRAWINGS

The subject invention may be more readily understood by reference to the following detailed description when that description is read with reference to the attached drawings wherein

FIG. 4 is a schematic diagram of an illustrative transmitter section for the optical regenerator shown in FIG. 1.

DETAILED DESCRIPTION

Optical Regenerator

Figure 1:
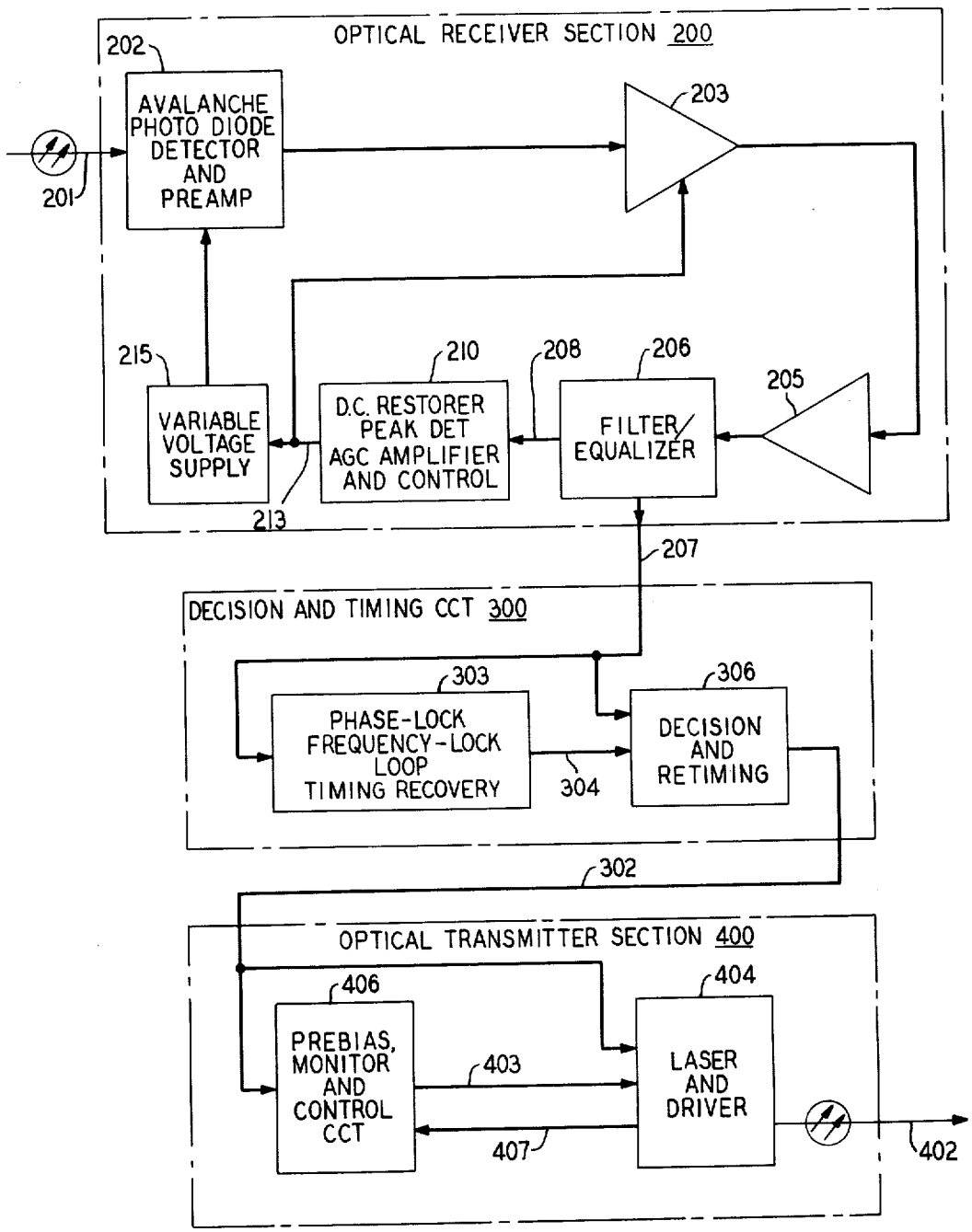
FIG. 1 is a block diagram of an illustrative optical pulse stream regenerator.

Referring now to FIG. 1, there is shown an optical regenerator for a fiber optic digital transmission system. Although the whole system is not shown, it is noted at the outset that optical signals in the system are inherently unipolar in nature. Light sources transmit full optical power for a 1 and are off for a 0. It is noted that for a typical laser source, as much as 5–10 percent of the power of a 1 is transmitted for a 0.

The regenerator includes a high gain optical receiver section 200 having a variable gain avalanche photodiode detector and preamplifier 202 for receiving the input unipolar optical data pulse stream 201 and converting it into a stream of electrical signals. The electrical signals are processed through a variable gain amplifier 203, a fixed gain amplifier 205, and a filter/equalizer 206 for producing an constant amplitude electrical data pulse stream that appears on a lead 207.

A pulse stream similar to the electrical data pulse stream on lead 207 is fed back through lead 208, a dc level restorer, peak detector and control circuit 210. Automatic gain control signals from circuit 210 are produced on a lead 213.

In the receiver section 200, different variable gain devices respond to separate ranges of the automatic gain control signal. Both the variable gain amplifier 203 and the avalanche photodiode detector 202 are variable gain devices which are biased for minimum gain in response to high level input optical pulses.

As the magnitude of the input optical pulses decreases causing the automatic gain control signal to increase through a first range, the control signal is applied by way of the lead 213 to the variable gain amplifier 203 and to a variable voltage supply 215. In this first range, only the variable gain amplifier 203 responds to the control signal by increasing gain as the magnitude of the input optical pulses decreases.

After gain of the variable amplifier 203 is increased to its full value, the control signal continues to increase and be applied to the amplifier 203 and the voltage supply 215. Only the variable voltage supply 215 responds to the control signal in this range causing gain of the avalanche photodiode to increase as the level of the optical pulses decreases further.

The electrical data pulse stream on lead 207 is applied to a decision and timing circuit 300 for regenerating on a lead 302 an electrical data pulse stream representing the incident optical data pulse stream. A phase-lock frequency-lock loop 303 produces, on a lead 304, a clock pulse stream that is recovered from information contained in the electrical data pulse stream from the receiver on the lead 207. A decision and retiming circuit 306 produces a regenerated electrical data pulse stream on the lead 302 in response to the clock pulse stream on the lead 304 and the electrical data pulse stream on the lead 207.

An optical transmitter section 400 regenerates an optical data pulse stream 402 in response to the regenerated electrical data pulse stream on the lead 302. The transmitter section 400 includes an injection laser 404 that is controlled by the regenerated electrical data pulse stream on lead 302 and by a prebias signal produced by a prebias, monitor and control circuit 406 on a lead 403. The prebias signal is established in response to the difference between a signal representing a sample 407 of the optical output power of the laser and a signal representing the regenerated electrical data pulse stream on the lead 302. The optical output data pulse stream 402 represents the incident optical data pulse stream.

Receiver Section

Figure 2:
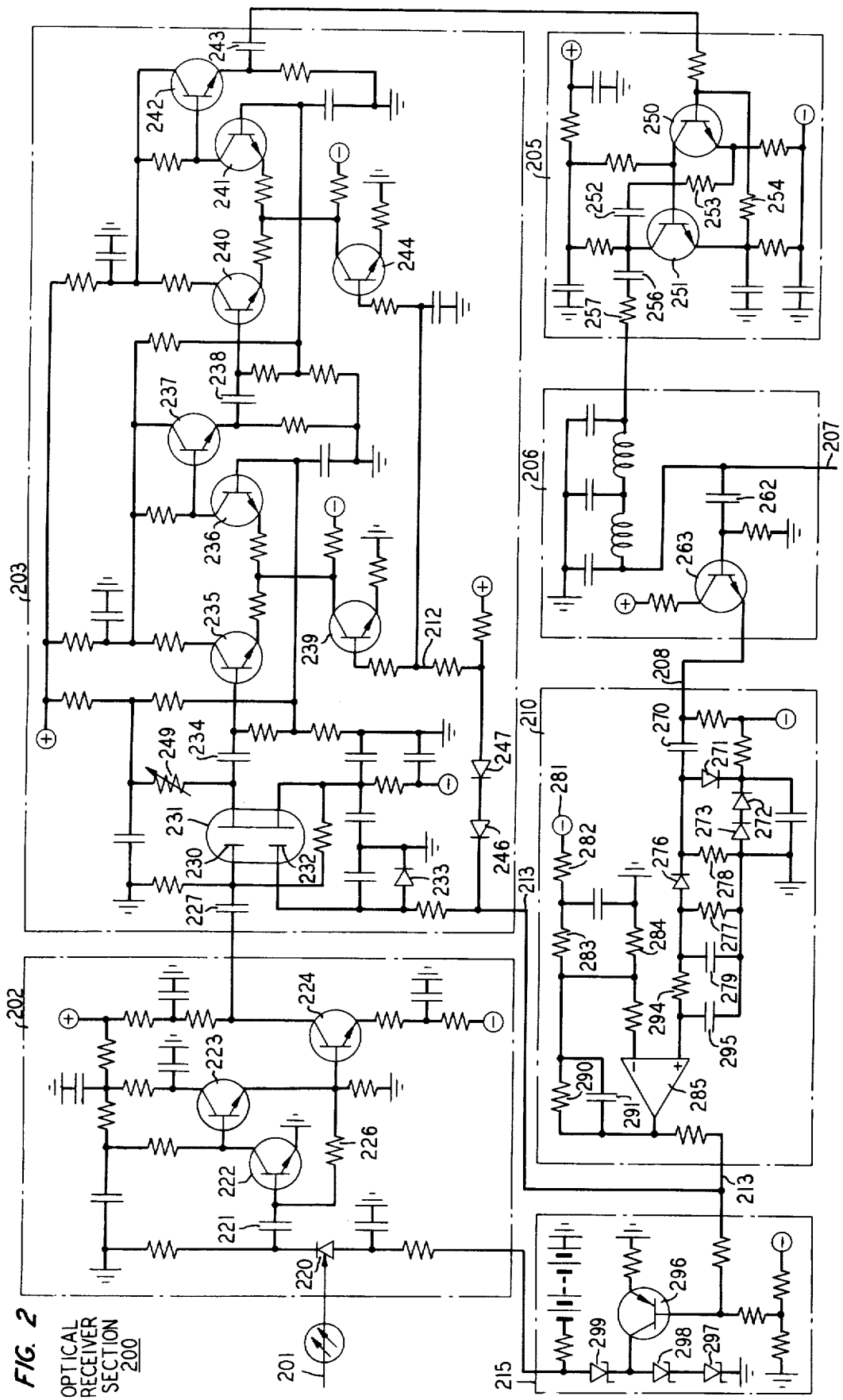
FIG. 2 is a schematic diagram of an illustrative receiver section for the optical regenerator shown in FIG. 1.

Referring now to FIG. 2, there is shown a detailed schematic diagram of the high gain optical receiver section 200 which detects input optical pulses of a data pulse stream received through an optical fiber 201 by converting those pulses into a stream of electrical data pulses on the lead 207.

The incident optical data pulse stream, which is applied by way of the optical fiber 201, impinges on a variable gain avalanche photodiode 220. A silicon avalanche photodiode is a semiconductor device that is normally operated with a reverse bias creating within the device a high electric field region. Varying the magnitude of the incident light varies current conducted by the avalanche photodiode and therefore the signal applied to a following preamplifier stage.

As a result of the incident optical data pulse stream, pairs of holes and electrons are generated within the avalanche photodiode. These holes and electrons drift in opposite directions in the device under influence of the electrical field. As the holes and electrons flow in opposite directions in the photodiode 220, they form pulses of current which are removed from the photodiode by the preamplifier circuitry connected to the photodiode.

The avalanche photodiode is a square law detector that produces a current that varies linearly in response to variations of incident light power. The photodiode 220 is arranged to provide variable gain to input optical signals in response to high voltage reverse bias variations generated by the voltage supply 215 in response to the control signal on lead 213, as described by P. K. Runge, *IEEE 1974 International Conference on Communications*, 17B. Lower power input light pulses cause greater bias voltage and a resulting maximum gain of approximately 40 dB. Higher power input light pulses cause a lower bias voltage and a resulting minimum gain of approximately 12 dB, determined by the characteristics of the avalanche photodiode. The arrangement for varying the bias voltage by the control signal on the lead 213 will be explained subsequently.

The pulses from the photodiode are coupled through a capacitor 221 to the base input of a common-emitter connected transistor 222 in the preamplifier 202. Output from the collector of the transistor 222 is coupled through an emitter-follower connected transistor 223 and is applied to the input of an output driver transistor 224 of the preamplifier 202. A feedback loop through a resistor 226 couples the output of the transistor 223 to the transistor 222 for stabilizing operation of the preamplifier 202. Preamplifier output signals produced at the collector of the transistor 224 are coupled through a capacitor 227 to the input of the variable gain amplifier 203 at a first gate electrode 230 of a dual gate MOS device 231.

The MOS device 231 is an n-channel enhancement-mode device arranged to present a high input impedance and to provide variable gain in response to the control signal applied by way of a second gate electrode 232. The source and drain electrodes are connected through resistors to sources of negative and positive potential, respectively. A diode 233 limits the control signal range which affects the gain of the MOS device 231. Gain can vary over a range from a minimum of −14 dB to a maximum of approximately 6 dB. A significant reduction in thermal noise is achieved by using the IGFET device rather than a bipolar transistor. The output from the drain of the MOS device 231 is coupled by way of a capacitor 234 to a cascade of two variable gain emitter-coupled pairs having emitter-followers in their outputs.

In the first emitter-coupled pair, signals from the MOS device 231 are applied to the base electrode of a transistor 235. Output signals generated at a collector electrode of another transistor 236 are coupled through an emitter-follower connected transistor 237 and a capacitor 238 to the second emitter-coupled pair. Gain of the first emitter-coupled pair is variable and is controlled by a signal applied to the base electrode of an emitter current source transistor 239. Maximum gain of approximately 13 dB occurs when sufficient emitter current is conducted to achieve minimum $r_e$ in the transistors 235 and 236. A minimum gain of approximately 3 dB is achieved by reducing emitter current and thereby increasing $r_e$ of the transistors 235 and 236.

In the second emitter-coupled pair, the signals coupled through the capacitor 238 are applied to the base input electrode of a transistor 240. Output signals, produced on the collector electrode of a transistor 241 are coupled through an emitter-follower transistor 242 and a capacitor 243 to the input of the fixed gain stage 205. Gain of the second emitter-coupled pair is controlled by a signal applied to the base electrode of the transistor 244. The gain of the second emitter-coupled pair also varies from a maximum of approximately 13 dB to a minimum of approximately 3 dB in response to changes of emitter current supplied through the emitter current source transistor 244.

A pair of diodes 246 and 247 shifts the control voltage in order to limit the signal range which affects the gain of the first and second emitter-coupled pairs. The gain varies as the control signal varies from a maximum negative value to approximately ground potential.

Full gain of the variable gain amplifier 203 is a design parameter which is selected to establish a secondary reference for determining the gain of the avalanche photodiode 220. The full gain of the amplifier 203 is selected so that the avalanche photodiode operates near its optimum gain when the smallest useful optical signals are received. Full gain of the amplifier 203 is adjusted for operation by initially adjusting a resistor 249 in the drain circuit of the MOS device 231.

The fixed gain stage 205 includes a pair of direct coupled common-emitter connected transistors 250 and 251 having a signal feedback path from the collector electrode of the transistor 251 through a capacitor 252 and a resistor 253 to the emitter electrode of the transistor 250. The signal feedback path stabilizes gain of the stage 205 over the useful band of the amplifier and provides a low output impedance. A direct current feedback path from the emitter electrode of the transistor 251 through a resistor 254 to the base electrode of the transistor 250 stabilizes bias of the fixed gain stage 205. The gain of amplifier stage 205 is approximately 26 dB. Output signals from the fixed gain stage 205 are produced at the collector of transistor 251 and are coupled through a capacitor 256 and a resistor 257 to the low-pass filter 206. The resistor 257 and the low output impedance of the stage 205 are selected to provide an optimum driving source impedance for the low-pass filter 206. A loss of about 6 dB occurs due to the resistor 257.

The preamplifier 202, the variable gain stages 203, and the fixed gain amplifier 205 include several capacitors inserted for suppressing power supply noise. Any selected power supply may be sufficiently free of noise that those capacitors become superfluous to operation of the receiver section 200.

The low-pass filter 206 is arranged to optimize an eye pattern for an ideal rectangular input pulse stream. The filter 206 is designed to shape pulses such that, for any useful input optical pulse stream and the actual frequency characteristic of the amplifiers 202 and 203, the pulses have a raised cosine shape or any other desirable shape for good regenerator performance. The filtered pulse stream is coupled through a capacitor 262, an emitter-follower connected transistor 263 and a lead 208 to the dc level restorer and peak detection circuit 210. Another output from the filter 206 is produced on the lead 207 for coupling the output pulse stream from the receiver to the decision and timing circuit 300, shown in FIG. 1. The termination for the filter 206 is located in the decision and timing circuit 300.

In the circuit 210, a direct current component is restored to the signal by that portion of the circuit including a capacitor 270 and a diode 271. The diode clamps the signal so that negative polarity pulses are forwarded. A pair of diodes 272 and 273 superimpose a fixed bias on the clamped signals to overcome voltage drop across the diode 271 and restore the direct current potential at a value slightly below ground potential.

The peak of the resulting waveform is thereafter determined by a peak detection arrangement including a forward biased diode 276, a pair of resistors 277 and 278, and a capacitor 279. Current flowing through the diode 276 leaves on the capacitor 279 a charge that is negative with respect to ground. Output of the peak detection circuit is compared with a reference voltage determined by the source of negative potential 281 and a voltage divider including resistors 282, 283 and 284. The comparison is performed by an operational amplifier 85 with feedback resistor 290 and resistor 284 setting the gain at 40 dB and capacitor 291 providing stability. The operational amplifier produces on its output lead 213 the automatic gain control signal that varies as a function of the difference between the detected signal peaks and the reference voltage. The automatic gain control signal falls to a negative potential of approximately 3 volts when the intensity of incident light is at a maximum and rises to a positive potential of approximately 4 volts when the intensity of incident light is at a minimum.

A resistor 294 and a capacitor 295 determine the cutoff frequency of the feedback loop. By choice this cutoff is established at approximately 0.25 Hz.

Noise is a limiting factor in the operation of the subject regenerator. There are three significant types of noise involved in the operation of the regenerator. Thermal noise arises in the MOS amplifier stage. Shot noise arises from the Poisson distribution of the primary electron current in the avalanche photodiode 220. Also, in the photodiode, excess multiplication noise occurs as a result of the gain process. The magnitude of the excess multiplication noise is significantly larger than the shot noise, is an increasing function of avalanche gain, and does not have a Gaussian amplitude distribution. Because the excess multiplication noise is gain dependent, there is an optimum value of avalanche gain. Because the noise is non-Gaussian, a new approach is used in the design of the receiver section.

The automatic gain control signal produced by the operational amplifier 285 on lead 213 is coupled to the variable voltage supply 215 for controlling the magnitude of the bias voltage applied to the avalanche photodiode 220. This varying bias voltage controls the gain of the avalanche photodiode. The gain control signal from the operational amplifier 285 also is applied to the variable gain stage 203 for controlling the gain thereof. This gain control signal causes changes of gain to compensate for any fluctuations in the magnitude of the output pulses in response to variations of the input optical pulses, aging of devices, or variation of ambient conditions.

As mentioned previously, the magnitude of the automatic gain control signal can vary widely. Different ranges of the gain control signal affect different ones of the aforementioned variable gain stages.

When the input optical pulses are at a high level, the bias voltage produced by the variable voltage supply 215 is held at a minimum value of approximately 150 volts so that the avalanche photodiode 220 operates near its minimum gain of approximately 12 dB. At the same time, the field effect transistor stage is operated at its minimum gain of approximately −14 dB. The emitter-coupled stages, in the variable gain stage 203, are each operated at a minimum gain of approximately 3 dB.

In the variable gain stage 03, the emitter-coupled pairs are arranged to the first stages responding to any decrease in the level of the input optical pulses. Such a reduction in the level of the input optical pulses causes the gain control signal on lead 213 to raise the potential on bases of the transistors 239 and 244 from the minimum of −3 volts. In response to this change in the automatic gain control signal on lead 213, the transistors 239 and 244 supply more current to the emitter-coupled pairs. As a result $r_e$ of the transistors 235, 236, 240 and 241 is reduced and their gain is increased in a first range of the automatic gain control signal until minimum $r_e$ occurs. The automatic gain control signal has no more effect on the emitter-coupled pairs when the control signal rises sufficiently to reverse bias the diodes 246 and 247.

As the automatic gain control signal swings more and more positively, it also increases the gain of the MOS device 231. The positive swing of the gain control signal that is applied to the device 231 is limited to one diode drop above ground potential by the limiting diode 233. The arrangement of the second gate of the MOS device 231 and the limiting diode 233 cause the gain of the MOS device to increase as the automatic gain control signal on lead 213 increases through a second range.

Additionally, the automatic gain control signal affects the variable voltage supply 215. When the control signal is at a low negative potential, a p-n-p transistor 296, which is arranged in a common-emitter configuration, conducts heavily shunting current away from a pair of zener diodes 297 and 298 in the voltage supply 215. At such a time the voltage output of the supply 215 is held at a minimum voltage of approximately 150 volts, as determined by another zener diode 299. After the gain control signal rises to about 1.5 volts positive with respect to ground, the transistor 296 conducts less and less. As the transistor is thus turned off, the zener diodes 297 and 298 conduct more and more current. The high voltage is increased gradually from the minimum of about 150 volts to a maximum of about 425 volts causing the gain of the avalanche photodiode 220 to increase from 12 dB to 40 dB. The zener diodes 297, 298 and 299 assure that the reverse bias never exceeds the maximum allowable bias of the photodiode 220. The third zener diode 299 in the high voltage supply is included therein to assure that the high voltage output never decreases below the desired minimum of 150 volts, the minimum bias for operating the photodiode 220.

It is advantageous to control both the avalanche gain and the electrical gain in a multiple range control loop. By this multiple range gain control loop, the avalanche gain is held at its relatively noiseless low gain when medium to high intensity input optical signals are received. The gain of the MOS device also is kept at its relatively noiseless low gain when high intensity input optical signals are received. Only the emitter-coupled pairs, which have insufficient gain to produce noise in the output, are adjusted in gain to compensate for variations of intensity in the high range of input optical signals. By separating the control of gain in different variable gain devices to separate ranges of the automatic gain control signal on lead 213, loop stability is maintained while better noise performance is achieved.

Decision and Timing Circuit

Figure 3:
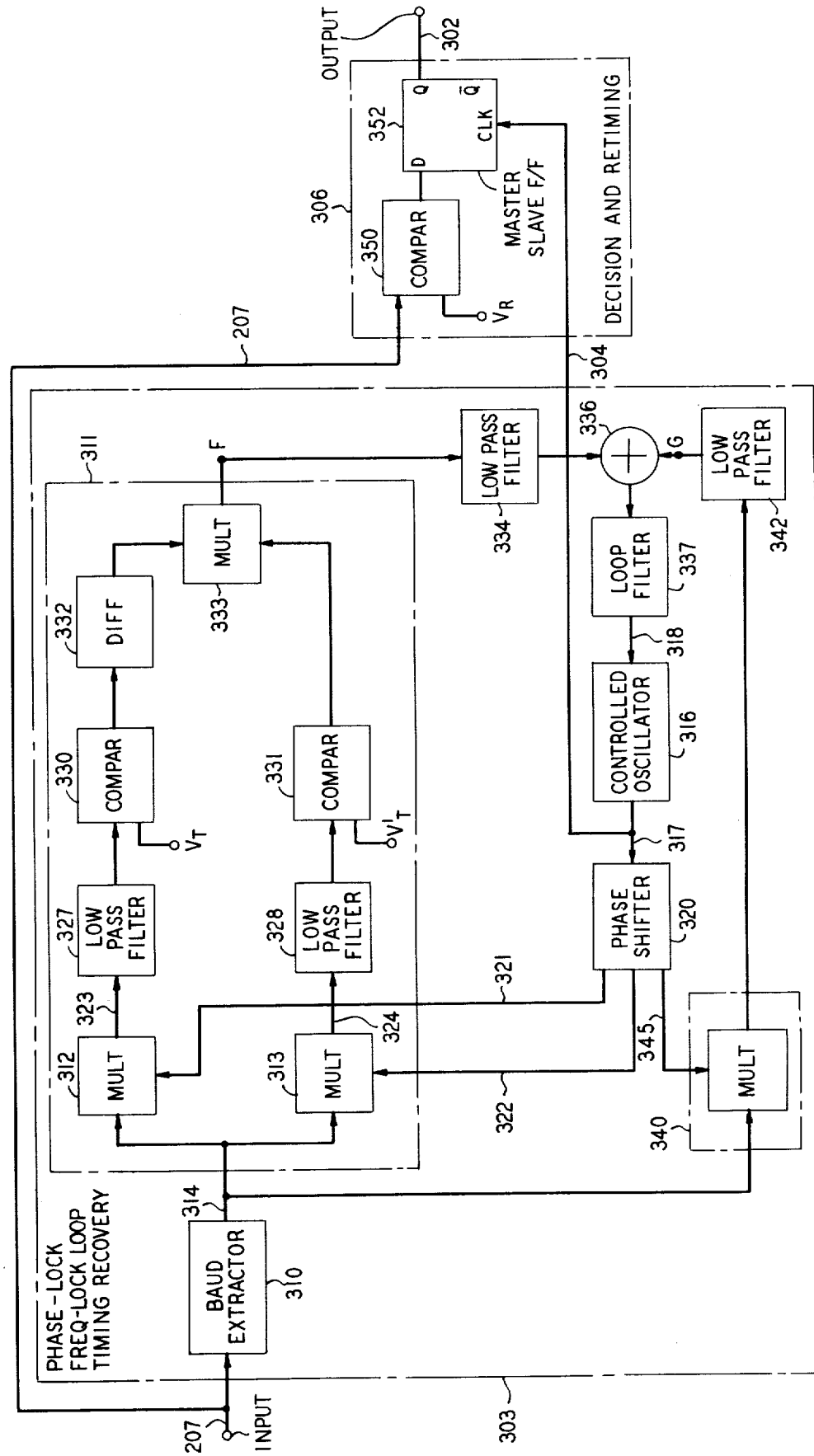
FIG. 3 is a block diagram of an illustrative decision and timing circuit for the optical regenerator shown in FIG. 1.

Referring now to FIG. 3, there is shown the decision and timing circuit 300 including a phase-lock frequency-lock loop timing recovery circuit 303 and a decision and retiming circuit 306. The timing recovery circuit 303 advantageously may be arranged like the circuit described in detail in a U.S. patent application, Ser. No. 607,331, filed Aug. 25, 1975 in the name of Jules A. Bellisio. The timing recovery circuit 303 is arranged for receiving the stream of data pulses occurring on the lead 207 and for producing on its output lead 304 a periodical low jitter timing signal. This timing signal forms a clock pulse stream that is synchronized with the incident optical data pulse stream. The decision and retiming circuit 306 generates on the lead 302, a regenerated electrical data pulse stream synchronized with the input optical pulse stream. The pulses have well defined high and low states, low timing jitter and a low error rate.

The baseband data signals on the lead 207 contain some information which characterizes the bit rate and the phase of the optical pulse stream. The characteristics of the bit rate and the phase, together with their statistical variation, are described by W. R. Bennett in the *Bell System Technical Journal*, Vol. 37, No. 6, November 1958 (pages 1501 through 1542). A baud extractor 310 includes a high-pass filter with a nonlinear characteristic for extracting from the data pulse stream on lead 207 both frequency and phase information of the data pulse stream.

The timing recovery circuit 303 includes in a frequency-lock loop a frequency difference detector arrangement 311 for producing error signals to reduce any difference between the baud of the data pulse stream on lead 207 and the frequency of a controlled oscillator 316 except when the amplitude of a baud component signal on a lead 314 falls below a predetermined value. In the frequency difference detector arrangement 311, there are first and second branches each including one of a pair of multipliers 312 and 313 which are arranged to multiply the extracted baud component signal on leads 314 with periodical signals produced by the controlled oscillator 316.

The controlled oscillator 316 is an adjustable frequency source that changes frequency of its output signals on lead 317 in response to control signals applied by way of a lead 318. A phase shifter 320 receives the output signals from the controlled oscillator 316 and produces on leads 321 and 322 output signals having the same frequency as the controlled oscillator but having phases which differ from each other. By multiplying the two different phase components of the periodic signals from the controlled oscillator 316 with the extracted baud component signal on leads 314, periodic waves including both frequency sum and frequency difference component signals are produced on leads 323 and 324 in the two branches.

The sum frequency components are filtered out by low-pass series filters 327 and 328. Frequency difference components pass through the filters 327 and 328 to the comparators 330, 331. Each of the comparators quantizes the frequency difference signals.

A nonideal differentiator 332 produces an output pulse for every transition in the waveform from the comparator 330. The output pulse rate from the differentiator is directly proportional to the frequency difference between the baud component of the signal on the leads 314 and the frequency of the controlled oscillator signal on lead 321 except when the amplitude of the baud component falls below the value required to produce a beat signal large enough to change the output level of the comparator.

The outputs of the differentiator 332 and the comparator 331 are multiplied together in a multiplier 333 which generates at node F a series of constant polarity pulses. These pulses occur at a rate that is directly proportional to the frequency difference between the baud component of the signal on the leads 314 and the frequency of the controlled oscillator signal on the lead 317. Polarity of the output control signals depends upon the sign of this frequency difference.

The frequency-lock loop includes a third branch wherein the output of the multiplier 333 is applied through a series circuit including a filter 334, a summing circuit 336, a loop filter 337 and the lead 318 to the controlled oscillator 316. The polarity of the control pulses at node F is such that they cause the frequency difference to decrease.

The phase-locked loop is a series circuit which includes a multiplier 340 which is coupled by way of a low-pass filter 342 to a second input of the summing circuit 336. It is further connected through the loop filter 337, the controlled oscillator 316, the phase shifter 320 and a lead 345 to a second input of the multiplier 340. In the summing circuit 336, a control component including phase error signals produced by the multiplier 340 and the filter 342 is combined with the series of pulses from the multiplier 333.

Phase-locking is achieved through the phase-lock loop when the frequency difference falls within the pull-in range of the phase-lock loop. As the phase of the oscillator 316 aligns with the phase of the input optical pulse stream, pulses at node F cease allowing the control signal on the lead 318 from the low-pass filter 337 to be a function of only the slowly varying phase-error voltage at node G. Magnitude of the phase-error voltage decreases until it reaches a small noise signal near zero when the phases are fully aligned.

The frequency-lock loop assures wide range pull-in regardless of the bandwidth of the phase-lock loop because the frequency-lock generates the stream of control pulses at node F in response to the frequency difference whenever the phases are not locked. In response to the signal derived from the stream of control pulses, the frequency of the oscillator 316 is swept toward the baud of the input optical pulse stream.

The stream of clock pulses on lead 304 from the oscillator 316 and the data pulse stream on lead 207 are applied concurrently to the decision and retiming circuit 306. In the decision and timing circuit, a comparator 350 samples the data pulses by comparing them with a reference level voltage $V_R$ for determining whether or not each input data pulse is a 1 or a 0. Because the transitions of the data pulses on lead 207 are somewhat irregular in timing, the output of the comparator 350 is a signal which is well defined in level but not in timing. This output signal is resampled by applying it to input D of a master-slave flip-flop 352 for retiming and reshaping.

The clock pulse sequence on lead 304 from the timing circuit 303 drives the master-slave flip-flop 352 for regenerating on the lead 302 the data pulse stream, as a stream of well-shaped electrical data pulses having nearly constant amplitude and consistent timing of transitions. This output electrical pulse stream is synchronized with and represents the incident optical data pulse stream.

Transmitter Section

Referring now to FIG. 4, there is shown a schematic diagram of the optical transmitter section 400 which receives the regenerated electrical data pulse stream on lead 302 and produces on a glass fiber 402 a regenerated optical pulse stream representing the input optical pulse stream. The optical transmitter section 400 advantageously may be arranged like the circit described in detail in a U.S. patent application, Ser. No. 668,824 filed on even date herewith in the name of Darrell D. Sell. The regenerated electrical data pulse stream on lead 302 is first applied to an inverter 401 for producing a negative polarity pulse for each input electrical pulse. The regenerated optical data pulse stream is produced by a stripe-geometry AlGaAs double heterostructure injection laser diode 410, which is connected to the collector output of a driving transistor 411 of an emitter-coupled pair including transistors 411 and 412. The characteristic curve of the laser diode 410, which plots output power as a function of driving current, includes a knee that causes a threshold in the characteristic. This threshold varies in response to changes of temperature of the laser and as a result of aging.

The regenerated electrical pulse stream on the lead 302 is applied to the base input of the transistor 412 while a reference voltage $V_X$ is applied to the base input of the transistor 411. The laser diode 410 is turned "On" and "OFF" in response to the level of the pulses applied to the transistor 412 by way of the lead 302 producing the output optical pulse stream 402 representing the input optical pulse stream.

Since the laser diode 410 has a characteristic including a threshold voltage, it is desirable to operate the laser with a prebias current, conducted through the lead 403 and having a magnitude slightly less than the value of the threshold current. Each negative polarity pulse from the inverter 401 will cause the total current conducted through the transistor 411 and the lead 403 to exceed the threshold of the laser causing the laser to emit a substantial optical pulse. Each low level signal from the inverter 401 will cause the transistor 411 to cut off and the laser to operate at the prebias current in the lead 403. This current is below the threshold level, causing a very low optical output from the laser 410.

The optical output on the glass fiber 402 is produced from a front surface of the laser diode 410. The optical pulse pattern from the laser can be stabilized against temperature fluctuations and aging by automatically adjusting the prebias current to maintain a constant light pulse power.

Such adjustments are made by a feedback circuit arrangement that derives a control signal from optical pulse power, emitted from the back mirror of the laser diode 410 and detected by a slow speed photodiode 413 which does not have to resolve the output pulses. The output of the photodiode 413 is proportional to the laser peak output averaged over the time constant of the photodiode. Current generated in the photodiode 413 is applied to one input of a high gain difference amplifier 414. A second input of the difference amplifier 414 is derived from the regenerated electrical data pulse stream on the lead 302.

The input data pulse stream from the inverter 401 is applied to a base input of a transistor 416 in an emitter-coupled comparator, including transistors 416 and 417. A reference voltage level $V_Y$ is applied to a base input of the same comparator. The comparator output signals taken from the collector of the transistor 417 are coupled to the second input of the difference amplifier 414 as a reference voltage.

The inputs to the difference amplifier 414 are coupled through identical low-pass filters 418 and 419 to average the signal peaks over several pulses. The output of the difference amplifier 414 is a control signal which varies as a function of the difference between the feedback derived from the optical output and the signal derived from the regenerated electrical pulse stream on the lead 302.

Output signals from the difference amplifier 414 are coupled through an amplifier 422 to the laser drive lead 425. The feedback control signal causes the difference amplifier 414 and the amplifier 422 to establish in lead 403 a prebias current which is conducted through the laser diode 410. The magnitude of the prebias current is adjusted by means of a potentiometer 430 and a resistor 431 so that the laser diode 410 operates slightly below its threshold when no pulses are applied over the lead 302. Any fluctuaion of the laser optical output caused by temperature variation or aging of the device will cause a corresponding change in current conducted through the photodiode 413. In response to this change of current, the high gain difference amplifier 414 and the amplifier 422 will generate a compensating change in the prebias current. The prebias current is thus compensated to maintain a constant optical output pulse level from the laser diode 410.

The input pulse stream that is applied to the prebias control circuit by way of the transistors 416 and 417 produces a variable reference level which is applied to the difference amplifier 414 for adjusting the prebias current in accordance with variations in the input pulse stream. This variable reference level further maintains the constant output optical pulse level. By referencing the prebias difference amplifier 414 to the signal derived from the input pulse stream, laser diode lifetime is prolonged over that of an arrangement wherein a constant reference level is applied to the difference amplifier 414. Such a constant reference level will cause the prebias current to rise when a long series of zeros occurs in the input pulse stream. A subsequent 1 or series of 1s can cause irreparable damage to the laser diode.

The foregoing describes an embodiment of the invention, and in view of that description, other embodiments will be obvious to those skilled in the art. The embodiment described herein and those additional embodiments are considered to be within the scope of the invention.

What is claimed is:
1. An optical pulse stream regenerator comprising
   means for receiving an optical data pulse stream and converting it to an electrical data pulse stream representing the received optical data pulse stream;
   means responsive to the electrical data pulse stream from the receiving means for recovering a clock pulse stream synchronized with the received optical data pulse stream;
   means responsive to the clock pulse stream and to the electrical data pulse stream from the receiving means for regenerating an electrical data pulse stream representing the received optical data pulse stream; and
   an optical transmitter including an injection laser responsive to the regenerated electrical data pulse stream and to a prebias signal, which is established in response to the difference between a signal representing the optical output of the laser and a signal representing the regenerated electrical data pulse stream, for regenerating an optical output data pulse stream representing the received optical data pulse stream.

2. An optical pulse stream regenerator in accordance with claim 1 wherein the optical transmitter further comprises
   a circuit for converting the regenerated electrical data pulse stream into a stream of current pulses representing the bits,
   a circuit for producing a prebias current,
   means for applying to the laser the prebias current and the curent pulses representing the bits, and
   means for controlling the prebias current in response to the difference between a signal representing the average optical output power of the laser and a signal representing the average of the regenerated electrical data pulse stream for regenerating the optical output data pulse stream.

3. An optical pulse stream regenerator in accordance with claim 1 wherein the means for receiving the optical data pulse stream comprises
   an optical receiver responsive to the received optical data pulse stream, the receiver including an amplifier stage providing variable gain in response to a first range of an automatic gain control signal and having an avalanche photodiode providing variable gain in response to a second range of the automatic gain control signal thereby maintaining electrical output data pulses at substantially the same magnitude regardless of fluctuations in the magnitude of pulses in the received optical data pulse stream.

4. An optical pulse stream regenerator in accordance with claim 3 wherein the optical transmitter further comprises
  a circuit for converting the regenerated electrical data pulse stream into a stream of current pulses representing the bits,
  a circuit for producing a prebias current,
  means for applying to the laser the prebias current and the current pulses representing the bits, and
  means for controlling the prebias current in response to the difference between a signal representing the average optical output power of the laser and a signal representing the average of the regenerated electrical data pulse stream for regenerating the optical output data pulse stream.

5. An optical stream regenerator comprising
  an optical receiver responsive to an incident optical data pulse stream for producing an electrical data pulse stream representing the incident optical data pulse stream, the optical receiver including an amplifier stage providing variable gain in response to a first range of an automatic gain control signal and having an avalanche photodiode providing variable gain in response to a second range of the automatic gain control signal thereby maintaining the electrical data pulses at substantially the same magnitude regardless of fluctuations in the magnitude of pulses in the incident optical data pulse stream;
  means responsive to the electrical data pulse stream from the optical receiver for recovering a clock pulse stream synchronized with the incident optical data pulse stream;
  means responsive to the clock pulse stream and to the electrical data pulse stream from the optical receiver for regenerating an electrical data pulse stream representing the incident optical data pulse stream; and
  an optical transmitter responsive to the regenerated electrical data pulse stream for regenerating an optical output data pulse stream representing the incident optical data pulse stream.

6. An optical pulse stream regenerator in accordance with claim 5 wherein the optical receiver further comprises
  a source for applying bias to the avalanche photodiode,
  means responsive to changes in the difference between a reference level voltage and the magnitude of a direct current component of the electrical data pulse stream from the optical receiver for varying the automatic gain control signal, and
  means applying the automatic gain control signal to the variable gain amplifier for varying the gain thereof and to the bias supplying source for adjusting the bias.

7. An optical pulse stream regenerator in accordance with claim 6 wherein the optical transmitter comprises an injection laser responsive to the regenerated electrical data pulse stream and to a prebias signal, which is established in response to the difference between a signal representing the optical output of the laser and a signal representing the regenerated electrical pulse stream, for regenerating the optical output pulse stream.

8. An optical pulse stream regenerator in accordance with claim 5 wherein the optical transmitter further comprises
  a circuit for converting the regenerated electrical data pulse stream into a stream of current pulses representing the bits,
  a circuit for producing a prebias current,
  means for applying to the laser the prebias current and the current pulses representing the bits, and
  means for controlling the prebias current in response to the difference between a signal representing the average optical output power of the laser and a signal representing the average of the regenerated electrical data pulse stream for regenerating the optical output data pulse stream.

9. An optical pulse stream regenerator comprising
  means for receiving an optical data pulse stream and converting it to an electrical data pulse stream representing the received optical data pulse stream;
  a phase-lock frequency-lock circuit responsive to the electrical data pulse stream from the receiving means for recovering a clock pulse stream synchronized with the received optical data pulse stream;
  a decision circuit responsive to the clock pulse stream and the electrical data pulse stream from the receiving means for regenerating an electrical data pulse stream representing the received optical data pulse stream; and
  an optical transmitter responsive to the regenerated electrical data pulse stream for regenerating an optical output data pulse stream representing the received optical data pulse stream.

10. An optical pulse stream regenerator in accordance with claim 9 wherein the optical transmitter comprises
  an injection laser responsive to the regenerated electrical data pulse stream and to a prebias signal, which is established in response to the difference between a signal representing the optical output of the laser and a signal representing the regenerated electrical data pulse stream, for regenerating the optical output data pulse stream.

11. An optical pulse stream regenerator in accordance with claim 10 wherein the optical transmitter further comprises
  a circuit for converting the regenerated electrical data pulse stream into a stream of current pulses representing the bits,
  a circuit for producing a prebias current,
  means for applying to the laser the prebias current and the current pulses representing the bits, and
  means for controlling the prebias current in response to the difference between a signal representing the average optical output power of the laser and a signal representing the average of the regenerated electrical data pulse stream for regenerating the optical output data pulse stream.

12. An optical pulse stream regenerator in accordance with claim 9 wherein the clock recovery circuit further comprises
  a baud extractor including a high-pass filter and a nonlinear circuit responsive to the electrical data pulse stream from the receiving means for producing a baud component signal representing the baud of the received optical data pulse stream,
  a frequency difference detector responsive to the baud component signal for producing a series of pulses having a polarity to reduce the difference between the frequency of a controlled clock pulse oscillator and the baud of the baud component signal and having a rate proportional to the difference, and a phase-lock loop responsive to the baud component signal for forcing the frequency and the phase of the controlled clock pulse oscillator into synchronization with the received optical data pulse stream, and the decision circuit further comprising a retimer, responsive to the electrical data pulse stream from the receiving means and the recovered clock pulse stream from the phase-lock frequency-lock circuit, for sampling and resampling the electrical data pulse stream from the receiving means to produce the regenerated electrical data pulse stream.

13. An optical pulse stream regenerator in accordance with claim 12 wherein the optical transmitter comprises an injection laser responsive to the regenerated electrical data pulse stream and to a prebias signal, which is established in response to the difference between a signal repesenting the optical output of the laser and a signal representing the regenerated electrical data pulse stream, for regenerating the optical output data pulse stream.

14. An optical pulse stream regenerator in accordance with claim 13 wherein the optical transmitter further comprises a circuit for converting the regenerated electrical data pulse stream into a stream of current pulses representing the bits, a circuit for producing a prebias current, means for applying to the laser the prebias current and the current pulses representing the bits, and means for controlling the prebias current in response to the difference between a signal representing the average optical output power of the laser and a signal representing the average of the regenerated electrical data pulse stream for regenerating the optical output data pulse stream.

15. An optical pulse stream regenerator in accordance with claim 9 wherein the optical receiving means comprise an optical receiver responsive to the received optical data pulse stream, the receiver including an amplifier stage providing variable gain in response to a first range of an automatic gain control signal and having an avalanche photodiode providing variable gain in response to a second range of the automatic gain control signal thereby maintaining the electrical data pulses at substantially the same magnitude regardless of fluctuations in magnitude of pulses in the received optical data pulse stream.

16. An optical pulse stream regenerator in accordance with claim 15 wherein the clock recovery circuit comprises a baud extractor including a high-pass filter and a nonlinear circuit responsive to the electrical data pulse stream from the receiving means for producing a baud component signal representing the baud of the received optical data pulse stream, a frequency difference detector responsive to the baud component signal for producing a series of pulses having a polarity to reduce the difference between the frequency of a controlled clock pulse oscillator and the baud of the baud component signal and having a rate proportional to the difference, and a phase-lock loop responsive to the baud component signal for forcing the frequency and the phase of the controlled clock pulse oscillator into synchronization with the received optical data pulse stream, and the decision circuit further comprising a retimer, responsive to the electrical data pulse stream from the receiving means and the recovered clock pulse stream from the phase-lock frequency-lock circuit, for sampling and resampling the electrical data pulse stream from the receiving means to produce the regenerated electrical data pulse stream.

17. An optical pulse stream regenerator in accordance with claim 15 wherein the optical receiver means further comprise a source for supplying bias to the avalanche photodiode, means responsive to changes in the difference between a reference level voltage and the magnitude of a direct current component of the electrical data pulse stream from the optical receiver for varying the automatic gain control signal, and means applying the automatic gain control signal to the variable gain amplifier for varying the gain thereof and to the bias supplying source for adjusting the bias.

18. An optical pulse stream regenerator in accordance with claim 17 wherein the clock recovery circuit further comprises a baud extractor including a high-pass filter and a non-linear circuit responsive to the electrical data pulse stream from the optical receiver for producing a baud component signal representing the baud of the received optical data pulse stream, a frequency difference detector responsive to the baud component signal for producing a series of pulses having a polarity to reduce the difference between the frequency of a controlled clock pulse oscillator and the baud of the baud component signal and having a rate proportional to the difference, and a phase-lock loop responsive to the baud component signal for forcing the frequency and the phase of the controlled clock pulse oscillator into synchronization with the received optical data pulse stream, and the decision circuit further comprising a retimer, responsive to the electrical data pulse stream from the optical receiver and the recovered clock pulse stream from the phase-lock frequencylock circuit, for sampling and resampling the electrical data pulse stream from the optical receiver to produce the regenerated electrical data pulse stream.

19. An optical pulse stream regenerator comprising an optical receiver responsive to an incident optical data pulse stream for producing an electrical data pulse stream representing the incident optical data pulse stream, the receiver having an amplifier stage providing variable gain in response to a first range of an automatic gain control signal and having an avalanche photodiode providing variable gain in response to a second range of the automatic gain control signal thereby maintaining the electrical data pulses at substantially the same magnitude regardless of fluctuations in the magnitude of pulses in the incident optical data pulse stream;

a phase-lock frequency-lock circuit responsive to the electrical data pulse stream from the optical receiver for recovering a clock pulse stream synchronized with the incident optical data pulse stream;

a decision circuit responsive to the clock pulse stream and the electrical data pulse stream from the receiver for regenerating an electrical data pulse stream representing the incident optical data pulse stream; and an optical transmitter including an injection laser responsive to the regenerated electrical data pulse stream and to a prebias signal, which is established in response to the difference between a signal representing the optical output of the laser and a signal representing the regenerated electrical data pulse stream, for regenerating an output optical data pulse stream representing the incident optical data pulse stream.

20. An optical pulse stream regenerator in accordance with claim 19 wherein the optical transmitter further comprises a circuit for converting the regenerated electrical data pulse stream into a stream of current pulses representing the bits, a circuit for producing a prebias current, means for applying to the laser the prebias current and the current pulses representing the bits, and means for controlling the prebias current in response to the difference between a signal representing the average optical output power of the laser and a signal representing the average of the regenerated electrical data pulse stream for regenerating the optical output data pulse stream.

21. An optical pulse stream regenerator in accordance with claim 19 wherein the clock recovery circuit further comprises a baud extractor including a high-pass filter and non-linear circuit responsive to the electrical data pulse stream from the optical receiver for producing a baud component signal representing the baud of the received optical data pulse stream, a frequency difference detector responsive to the baud component signal for producing a series of pulses having a polarity to reduce the difference between the frequency of a controlled clock pulse oscillator and the baud of the baud component signal and having a rate proportional to the difference, and a phase-lock loop responsive to the baud component signal for forcing the frequency and the phase of the controlled clock pulse oscillator into synchronization with the received optical data pulse stream, and the decision circuit further comprising a retimer, responsive to the electrical data pulse stream from the optical receiver and the recovered clock pulse stream from the phase-lock frequency-lock circuit, for sampling and resampling the electrical data pulse stream from the optical receiver to produce the regenerated electrical data pulse stream.

22. An optical pulse stream regenerator in accordance with claim 21 wherein the optical transmitter further comprises a circuit for converting the regenerated electrical data pulse stream into a stream of current pulses representing the bits, a circuit for producing a prebias current, means for applying to the laser the prebias current and the current pulses representing the bits, and means for controlling the prebias current in response to the difference between a signal representing the average optical output power of the laser and a signal representing the average of the regenerated electrical data pulse stream for regenerating the optical output data pulse stream.

23. An optical pulse stream regenerator in accordance with claim 19 wherein the optical receiver further comprises a source for supplying bias to the avalanche photodiode, means responsive to changes in the difference between a reference level voltage and the magnitude of a direct current component of the electrical data pulse stream from the optical receiver for varying the automatic gain control signal, and means applying the automatic gain control signal to the variable gain amplifier for varying the gain thereof and to the bias supplying source for adjusting the bias.

24. An optical pulse stream regenerator in accordance with claim 23 wherein the optical transmitter further comprises a circuit for converting the regenerated electrical data pulse stream into a stream of current pulses representing the bits, a circuit for producing a prebias current, means for applying to the laser the prebias current and the current pulses representing the bits, and means for controlling the prebias current in response to the difference between a signal representing the average optical output power of the laser and a signal representing the average of the regenerated electrical data pulse stream for regenerating the optical output data pulse stream.

25. An optical pulse stream regenerator in accordance with claim 23 wherein the clock recovery circuit further comprises a baud extractor including a high-pass filter and a non-linear circuit responsive to the electrical data pulse stream from the optical receiver for producing a baud component signal representing the baud of the received optical data pulse stream, a frequency difference detector responsive to the baud signal for producing a series of pulses having a polarity to reduce the difference between the frequency of a controlled clock pulse oscillator and the baud of the baud component signal and having a rate proportional to the difference, and a phase-lock loop responsive to the baud component signal for forcing the frequency and the phase of the controlled clock pulse oscillator into synchronization with the received optical data pulse stream, and the decision circuit further comprising a retimer, responsive to the electrical data pulse stream from the optical receiver and the recovered clock pulse stream from the phase-lock frequency-lock circuit, for sampling and resampling the electrical data pulse stream from the optical receiver to produce the regenerated electrical data pulse stream.

26. An optical pulse stream regenerator in accordance with claim 25 wherein the optical transmitter further comprises a circuit for converting the regenerated electrical data pulse stream into a stream of current pulses representing the bits, a circuit for producing a prebias current, means for applying to the laser the prebias current and the current pulses representing the bits, and means for controlling the prebias current in response to the difference between a signal representing the average optical output power of the laser and a signal representing the average of the regenerated electrical data pulse stream for regenerating the optical output data pulse stream.

27. An optical pulse stream receiver comprising means for receiving an optical data pulse stream and converting it to an electrical data pulse stream representing the incident optical data pulse stream;

a phase-lock frequency-lock circuit responsive to the electrical data pulse stream from the receiving means for recovering a clock pulse stream synchronized with the incident optical data pulse stream; and a decision circuit responsive to the clock pulse stream and the electrical data pulse stream from the receiver for regenerating an electrical data pulse stream representing the incident optical data pulse stream.

28. An optical pulse stream receiver in accordance with claim 27 further comprising a baud extractor including a high-pass filter and a non-linear circuit responsive to the electrical data pulse stream from the receiving means for producing a baud component signal representing the baud of the incident optical data pulse stream, the phase-lock frequency-lock circuit further comprising a frequency difference detector responsive to the baud component signal for producing a series of pulses having a polarity to reduce the difference between the frequency of a controlled clock pulse oscillator and the baud of the baud component signal and having a rate proportional to the difference, and a phase-lock loop responsive to the baud component signal for forcing the frequency and the phase of the controlled clock pulse oscillator into synchronization with the incident optical data pulse stream, and the decision circuit further comprising a retimer, responsive to the electrical data pulse stream from the receiving means and the recovered clock pulse stream from the phase-lock frequency-lock circuit, for sampling and resampling the electrical data pulse stream from the receiving means to produce the regenerated electrical data pulse stream.

29. An optical pulse stream receiver in accordance with claim 28 wherein the receiving means comprise an optical receiver responsive to the incident optical data pulse stream, the receiver including an amplifier stage providing variable gain in response to a first range of an automatic gain control signal and having an avalanche photodiode providing variable gain in response to a second range of the automatic gain control signal thereby maintaining the electrical data pulses at substantially the same magnitude regardless of fluctuations in magnitude of pulses in the incident optical data pulse stream.

30. An optical pulse stream receiver in accordance with claim 29 wherein the receiving means further comprise a source for supplying bias to the avalanche photodiode, means responsive to changes in the difference between a reference level voltage and the magnitude of a direct current component of the electrical data pulse stream from the optical receiver for varying the automatic gain control signal, and means applying the automatic gain control signal to the variable gain amplifier for varying the gain thereof and to the bias supplying source for adjusting the bias.

31. An optical pulse stream receiver in accordance with claim 27 wherein the receiving means comprise an optical receiver responsive to the incident optical data pulse stream, the receiver including an amplifier stage providing variable gain in response to a first range of an automatic gain control signal and having an avalanche photodiode providing variable gain in response to a second range of the automatic gain control signal thereby maintaining the electrical data pulses at substantially the same magnitude regardless of fluctuations in magnitude of pulses in the incident optical data pulse stream.

32. An optical pulse stream receiver in accordance with claim 31 wherein the receiving means further comprise a source for supplying bias to the avalanche photodiode, means responsive to changes in the difference between a reference level voltage and the magnitude of a direct current component of the electrical data pulse stream from the optical receiver for varying the automatic gain control signal, and means applying the automatic gain control signal to the variable gain amplifier for varying the gain thereof and to the bias supplying source for adjusting the bias.

33. An optical pulse stream receiver comprising means for receiving an incident optical pulse stream, the receiving means including an amplifier stage providing variable gain in response to a first range of an automatic gain control signal and having an avalanche photodiode providing variable gain in response to a second range of the automatic gain control signal thereby maintaining the electrical data pulses at substantially the same magnitude regardless of fluctuations in magnitude of pulses in the incident optical data pulse stream, means responsive to the electrical data pulse stream from the receiving means for recovering a clock pulse stream synchronized with the incident optical data pulse stream, and means responsive to the clock pulse stream and to the electrical data pulse stream from the receiving means for regenerating an electrical data pulse stream representing the incident optical data pulse stream.

34. An optical pulse stream receiver in accordance with claim 33 wherein the receiving means further comprise a source for supplying bias to the avalanche photodiode, means responsive to changes in the difference between a reference level voltage and the magnitude of a direct current component of the electrical data pulse stream from the optical receiving means for varying the automatic gain control signal, and means applying the automatic gain control signal to the variable gain amplifier for varying the gain thereof and to the bias supplying source for adjusting the bias.

* * * * *